United States Patent

[11] 3,536,104

[72] Inventor Daniel Lejeune
 Clermont-Ferrand, France
[21] Appl. No. 699,254
[22] Filed Jan. 19, 1968
[45] Patented Oct. 27, 1970
[73] Assignee Compagnie Generale Des Etablissements
 Michelin, raison sociale Michelin & Cie
 Clermont-Ferrand(Ruy-de-Dome), France
[32] Priority Jan. 30, 1967
[33] France
[31] No. 1871

[54] REINFORCED RUBBER TUBES
 4 Claims, 4 Drawing Figs.
[52] U.S. Cl. .................................................. 138/130,
 138/138
[51] Int. Cl. ..................................................... F16l 11/08
[50] Field of Search ........................................ 138/138,
 130, 137, 132, 133

[56] References Cited
 UNITED STATES PATENTS
1,011,090 12/1911 Subers ......................... 138/130
2,151,307 3/1939 Smith .......................... 138/138
3,318,337 5/1967 Bauer .......................... 138/130

Primary Examiner—Laverne D. Geiger
Assistant Examiner—R. J. Sher
Attorney—Brunbaugh, Graves, Donohue & Raymond ABSTRACT: A rubber tube is provided with concentric layers of metal cables. The cables in successive layers are wound helicoidally alternatingly in the S direction and the Z direction around the axis of the tube. Each cable comprises a plurality of concentric layers of elemental wires all wound helicoidally in the same direction around the axis of the cable. The direction of winding of the elemental wires around the axis of each cable is the same as the direction of winding around the axis of the tube of such cable.

In placing a metal armor, including a plurality of cables, on a tube, the cables are wound helicoidally on the tube and twisted about their axis a number of turns per meter substantially equal to $500 \sin 2\alpha/\pi D$ wherein D is the diameter in millimeters of the helix formed by the wound cable and $\alpha$ is the angle formed by the wound cable with the axis of the helix, the direction of the twisting being opposite to the direction of the winding twist imparted to the cables about their axes by virtue of their being wound helicoidally, whereby the winding twist is compensated at least partially.

Patented Oct. 27, 1970

3,536,104

INVENTOR.
DANIEL LEJEUNE
BY
Bauerbaugh, Free, Graves & Donohue
his ATTORNEYS

REINFORCED RUBBER TUBES

BACKGROUND OF THE INVENTION

This invention relates to improvements of reinforced rubber tubes and, more particularly, to tubes the reinforcement of which comprises metal cords arranged in concentric superimposed layers rather than in braids. The invention relates also to a novel and highly effective method of placement of a metal armor, including a plurality of cables, on a tube.

The armoring of rubber tubing by means of wires or cables is well known. The wires or cables may consist of textiles or metals in plies and not braided; i.e., the textiles or metals may be arranged in superimposed layers which are concentric and wound helicoidally around the axis of the tube, the direction of the winding alternating from layer to layer. By means of an armor in plies, one obtains a more elastic tubing than by means of a braided armor, while the resistance is at least comparable if one uses wires or cables which adhere well to the elastomer employed in the tube.

In order to provide rubber tubing with very high resistance, especially to internal pressure, it is of course advisable to use a metal reinforcement comprising cables formed by assembling elemental wires of small diameter, for example, ranging from 0.10 to 0.25 mm, so that the elasticity of the armored tube is preserved. Towards such end, it is customary to use cables wherein the elemental wires are assembled in strands which, in turn, are assembled with one another in order to form a cable.

In place of stranded cables, which have the disadvantage of having an overall cross section which is comparatively large in relation to the total cross section of the elemental metal wires used, metal cables have been used which consist of superimposed and concentric layers of wires which are less bulky while containing the same quantity of metal. However, it has been found, mainly in cables containing a large number of elemental wires distributed in more than two layers, and also in tubes having a small diameter (less than 40 mm, for example), that there occurs a considerable reduction in useful life, contrary to what had been expected, and also a deformation of the cables, certain layers of which expand while others of which contract.

SUMMARY OF THE INVENTION

An object of the present invention is to remedy the disadvantage noted above of tubes reinforced by cables comprising wires distributed in layers. A further object of the invention is to obtain, for the same overall dimension of the reinforcement, more resistant tubes than conventional tubes having cables composed of strands. Another object of the invention is to provide tubes of the expansible kind suitable for purposes of hydraulic rock blasting or for piping in water under pressure, especially into coal or ore in massive deposits.

The foregoing and other objects of the invention are attained by the provision of rubber tubes with metal armor, the tubes comprising an even number of layers of cables wound alternatingly in S- and in Z-form around the axis of the tube. The tubes are characterized in that each cable thereof is composed of several superimposed and concentric layers of elemental wires, preferably all wound helicoidally in the same direction (S or Z), while it is furthermore preferred that the direction of the S or Z windings of these elemental wires be the same as the direction of helicoidal winding around the axis of the tube of the cable to which the windings pertain.

The two forms, S and Z, of helicoidal winding of a cable around an axis are easy to distinguish by imagining that the cable segments on the side of the axis towards the observer are the central portions of one of those two letters. The type of winding as established by this test remains the same regardless of the direction from which the cable is viewed and regardless of the orientation of the cable.

The method in accordance with the invention of applying the sheathing of a tube comprises compensating in part or in full for the twist imparted to the cables during their helicoidal winding, by means of an untwisting, either in advance, which is preferred, or during the helicoidal winding of the cables. The number of untwisting turns per meter of cable is preferably $\frac{500 \sin 2\alpha}{\pi D}$, wherein D is the diameter in millimeters of the helix formed by the wound cable and $\alpha$ is the angle formed by the wound cable with the axis of the helix.

A single wire which is helically wound around a cylinder undergoes, as a result of such winding, a twist the direction of which depends on the direction of winding around the cylinder and the amplitude of which is the product of (a) the number of helical turns and (b) $\cos\alpha$.

In a cable which consists of several layers of single or elemental wires, one creates a twist upon winding the cable helicoidally unless one takes compensating precautions. Such twist results in the displacement of the wires of the various layers with respect to one another. This disadvantage becomes more serious if the wires of the various layers are wound helicoidally in different directions, for example alternatingly in S or in Z form, and also if the direction of the S- or Z-winding of the cable differs from the direction of winding of the elemental wires, mainly of the outermost layer. Even if one provides for compensation of the twist resulting from the helicoidal winding, it is important that one use as cables wound in S formation such cables as have all their wires likewise wound in S formation, and as cables wound in Z formation such cables as have all their wires likewise wound in Z formation. By virtue of this construction, a variation of the diameter of the tube or a variation of the angle of inclination of the cables, due to any stresses to which the tube may be subjected during service, causes all the cables and all the elemental wires to respond in the same manner and in the same direction. The stresses are thus more uniformly distributed, and the cables or wires wound in one direction are not overstressed in relation to the cables or wires wound in the other direction.

As concerns the method of application or laying in accordance with the invention, the twist engendered on helicoidal winding may be compensated either when the cables are laid or before that.

For the purpose of compensation of the twist during the application, it is sufficient to provide for turning feed reels. The cable reels, while unrolling, must simultaneously be driven in rotation around an axis perpendicular to their longitudinal axis, so as to impart to the cable which is being helicoidally wound around the tube being fabricated a twist which is opposite that which it undergoes by virtue of the helicoidal winding. The speed of twisting or of untwisting should yield a number of turns per meter of cable which is approximately $$\frac{500 \sin 2\alpha}{\pi D}.$$

As the angle $\alpha$ is always close to 45° plus or minus approximately 10 to 15°, and consequently $\sin 2\alpha$ is always close to 1, this term may generally be simplified to 160/D, D being the diameter in millimeter of the helix formed by the wound cable.

If no turning reels are available, the twist may be compensated in advance by giving the cable a suitable kinking or twist. The cable should be in equilibrium, i.e., it should become inert, after being wound at a given angle to form a helix of given diameter. For example, for a helicoidal winding with a diameter of 16mm at an angle of 54°, the cable should have a tendency to kink or twist 9 to 10 turns per meter, regardless of whether wound in S or Z formation. This tendency to kink is imparted during manufacture of the cable by giving the core of the cable as well as the wires constituting the outer layer or layers some pre-twistings in the suitable direction, prior to assembly. This solution is economically preferable inasmuch as it simplifies the equipment needed for placing of the armor of the tube without thereby complicating the manufacture of the cables beyond the capabilites of the equipment customarily used.

BRIEF DESCRIPTION OF THE DRAWING

Additional aspects of the invention may be understood by reference to the following detailed description of a representative embodiment thereof and to the attached drawings, wherein.

DESCRIPTION OF THE PREFERRED EMBODIMENT

Figure 1:
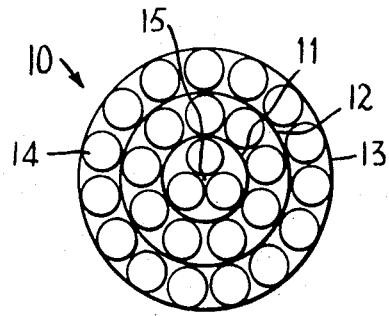
FIG. 1 is a cross section of a cable made with three layers of wires and adapted to facilitate formation of a tube in accordance with the invention.

In FIG. 1, there appears the cable 10 containing three concentric layers 11, 12 and 13 of elemental wires 14. These layers comprise, respectively, three, nine and fifteen steel wires of 0.18 mm diameter. All wires are wound helicoidally around the axis 15 of the cable.

Figure 2:
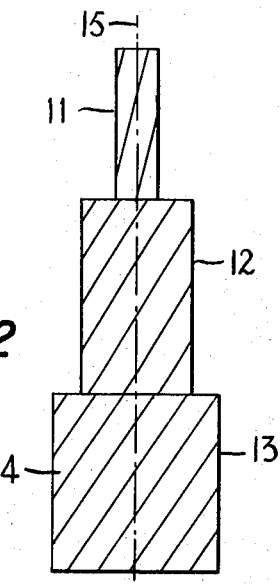
FIG. 2 is a broken-away view in elevation of the cable of FIG. 1.

As shown in FIG. 2, the wires of the different layers are all wound in the same direction, i.e., in Z direction in this FIG. The winding direction is the same if FIG. 2 is viewed upside down, for example. The pitches of the different layers are 16 mm for the interior layer 11, 12 mm for the intermediate layer 12 and 6 mm for the outer layer 13.

Figure 3:
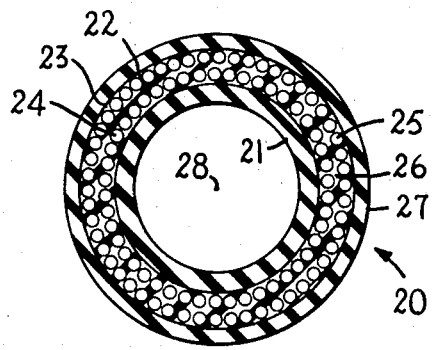
FIG. 3 is a cross section of a tube in accordance with the invention having two layers of cables of the type shown in FIGS. 1 and 2.
Figure 4:
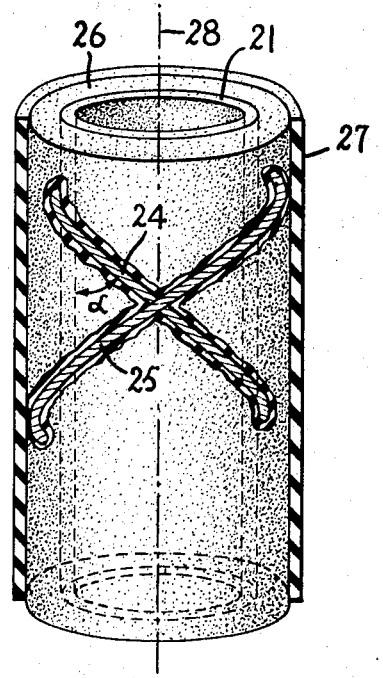
FIG. 4 is a broken-away prospective view of the tube of FIG. 3.

FIG. 3 shows in cross section a tube 20 in accordance with the invention. There are in succession, from the inside towards the outside, an inner lining 21, two layers 22 and 23 of cables 24 and 25 embedded in an elastomer 26, and an outer protective sheath 27. As seen in FIG. 4, the two cables 24 and 25 are of the type shown in FIGS. 1 and 2 but differ in their direction of winding around the axis 28 of the tube and in the direction of winding of the elemental wires forming them. The cable 24 is wound in S direction and comprises wires which are also wound in S direction. The cable 25 is wound in Z direction and consists of wires likewise wound in Z direction. The cables 24 and 25 form an angle $\alpha$ of 40° with the axis 28 and describe helices having an average diameter of 28 mm. Thus, the cables are given an untwisting of approximately five turns per meter to compensate for the twist caused by the helicoidal winding.

The tube shown in FIG. 3 is an expansible tube used for hydraulic blasting of rocks; it resists a working pressure of 600 bars.

Thus there is provided in accordance with the invention a novel and highly effective tube which is capable of withstanding very high internal pressure, the layers of which expand and contract in a coordinated manner, and which has many uses including, notably, hydraulic rock blasting and piping of water under all conditions where high pressure is desired. There is also provided in accordance with the invention a novel and highly effective method of making an armored tube by virtue of which the tube can be manufactured precisely to specification at minimum cost.

Many modifications in form and detail of the representative embodiment of the invention disclosed herein will readily occur to those skilled in the art. For example, while a tube having only two layers of cables is illustrated, one having four or more layers may also be employed. Accordingly, the invention is to be construed as including all the modifications thereof within the scope of the appended claims.

I claim:

1. A rubber tube comprising an even number of concentric layers of metal cables, the cables in successive layers being wound helicoidally alternatingly in opposite directions around the axis of the tube, each cable comprising a plurality of concentric layers of elemental wires all wound helicoidally in the same direction around the axis of the cable, the direction of winding of the elemental wires around the axis of each cable being the same as the direction of winding around the axis of the tube of such cable and the pitches of the windings of the wires in successive layers being different.

2. In a method of placement of a metal armor, including a plurality of cables, on a tube, the steps comprising winding the cables helicoidally on the tube and twisting the cables about their axes a number of turns per meter substantially equal to $$\frac{500 \sin 2\alpha}{\pi D}$$

wherein D is the diameter in millimeters of the helix formed by the wound cable, and $\alpha$ is the angle formed by the wound cable with the axis of the helix, the direction of the twisting being opposite to the direction of the winding twist imparted to the cables about their axes by virtue of their being wound helicoidally, whereby said winding twist is compensated at least partially.

3. The method of claim 2 in which said twisting preceds said winding.

4. The method of claim 2 in which said twisting and winding are simultaneous.